United States Patent
Pierson, Jr.

(10) Patent No.: US 6,487,198 B1
(45) Date of Patent: Nov. 26, 2002

(54) METHOD AND SYSTEM FOR UNLOADING T1 PAYLOADS FROM ATM CELLS

(75) Inventor: Forrest L. Pierson, Jr., Dallas, TX (US)

(73) Assignee: MCI Communications Corporation, Washington, DC (US)

(*) Notice: Subject to any disclaimer, the term of this patent is extended or adjusted under 35 U.S.C. 154(b) by 0 days.

(21) Appl. No.: 09/097,755

(22) Filed: Jun. 16, 1998

(51) Int. Cl.[7] .............................................. H04L 12/66
(52) U.S. Cl. .................. 370/356; 370/395.52; 370/466; 370/543
(58) Field of Search .................. 370/352, 356, 370/395, 465, 466–467, 468, 395.52, 516, 517, 535–545; 375/372

(56) References Cited

U.S. PATENT DOCUMENTS

| | | | | |
|---|---|---|---|---|
| 5,550,820 A | * | 8/1996 | Baran | |
| 5,563,885 A | * | 10/1996 | Witchey | |
| 5,608,731 A | * | 3/1997 | Upp et al. | |
| 5,805,588 A | * | 9/1998 | Petersen | |
| 5,889,773 A | * | 3/1999 | Stevenson, III | 370/352 |
| 5,953,318 A | * | 9/1999 | Natkemper et al. | |
| 6,018,525 A | * | 1/2000 | Sucharczuk | |

* cited by examiner

*Primary Examiner*—Melvin Marcelo
*Assistant Examiner*—Inder Palmehra

(57) ABSTRACT

The present invention is directed to a method and system for unloading one or more T1 payloads from a target ATM cell where a target ATM cell has traveled over an ATM network that is emulating a T1 link. A plurality of ATM cells are stored in a cell buffer at a first rate. A buffer controller selects the target ATM cell from the bottom of the cell buffer. The buffer controller sends the T1 payloads carried in the target ATM cell to an elastic store buffer. The elastic buffer sends a plurality of timeslots in each T1 payload to a switch matrix at a second rate.

32 Claims, 10 Drawing Sheets

T1 Emulation over an ATM Network

Extended Superframe

ATM Cell Structure

Two T1 Frames carried in a single ATM cell

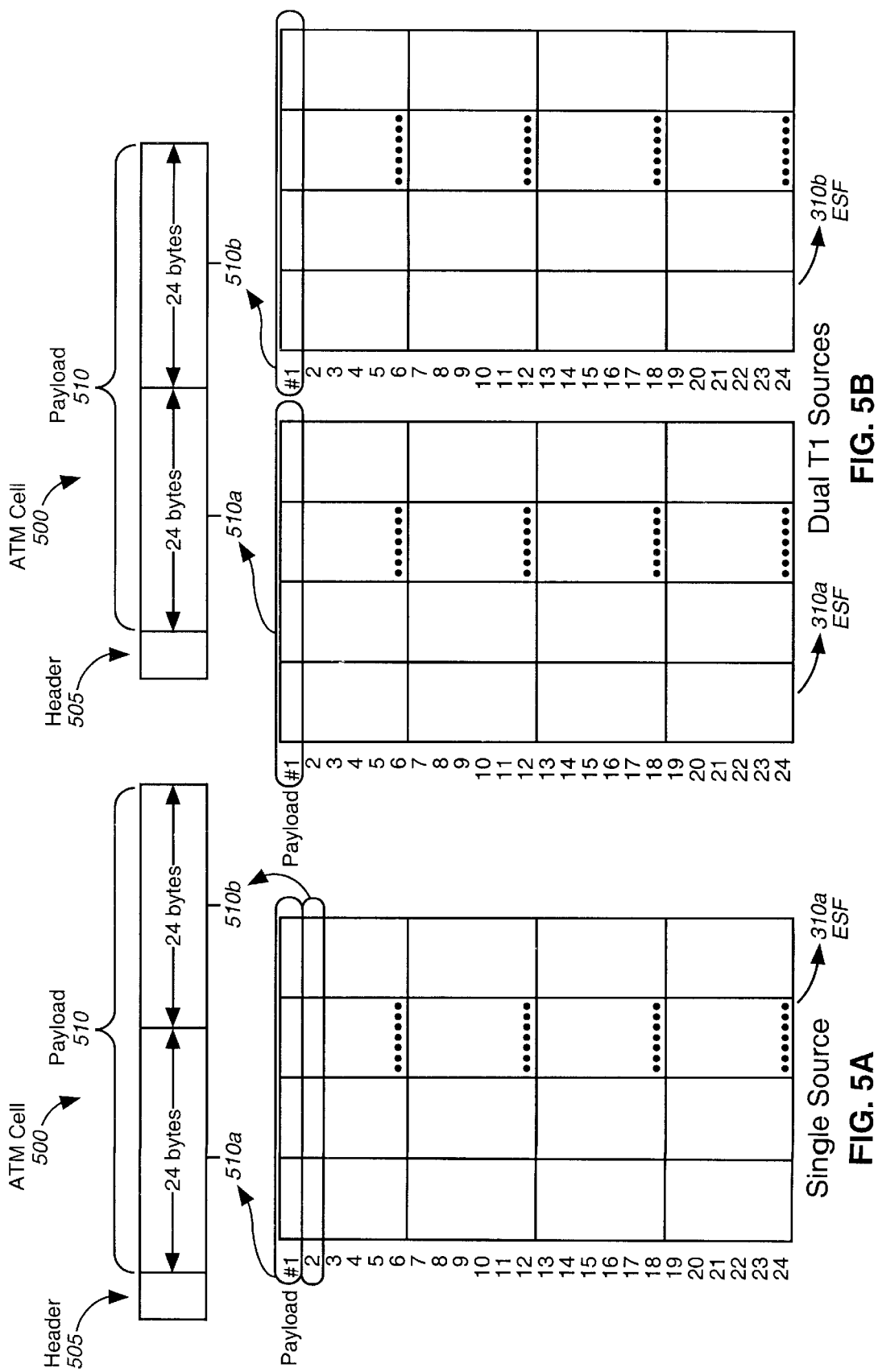

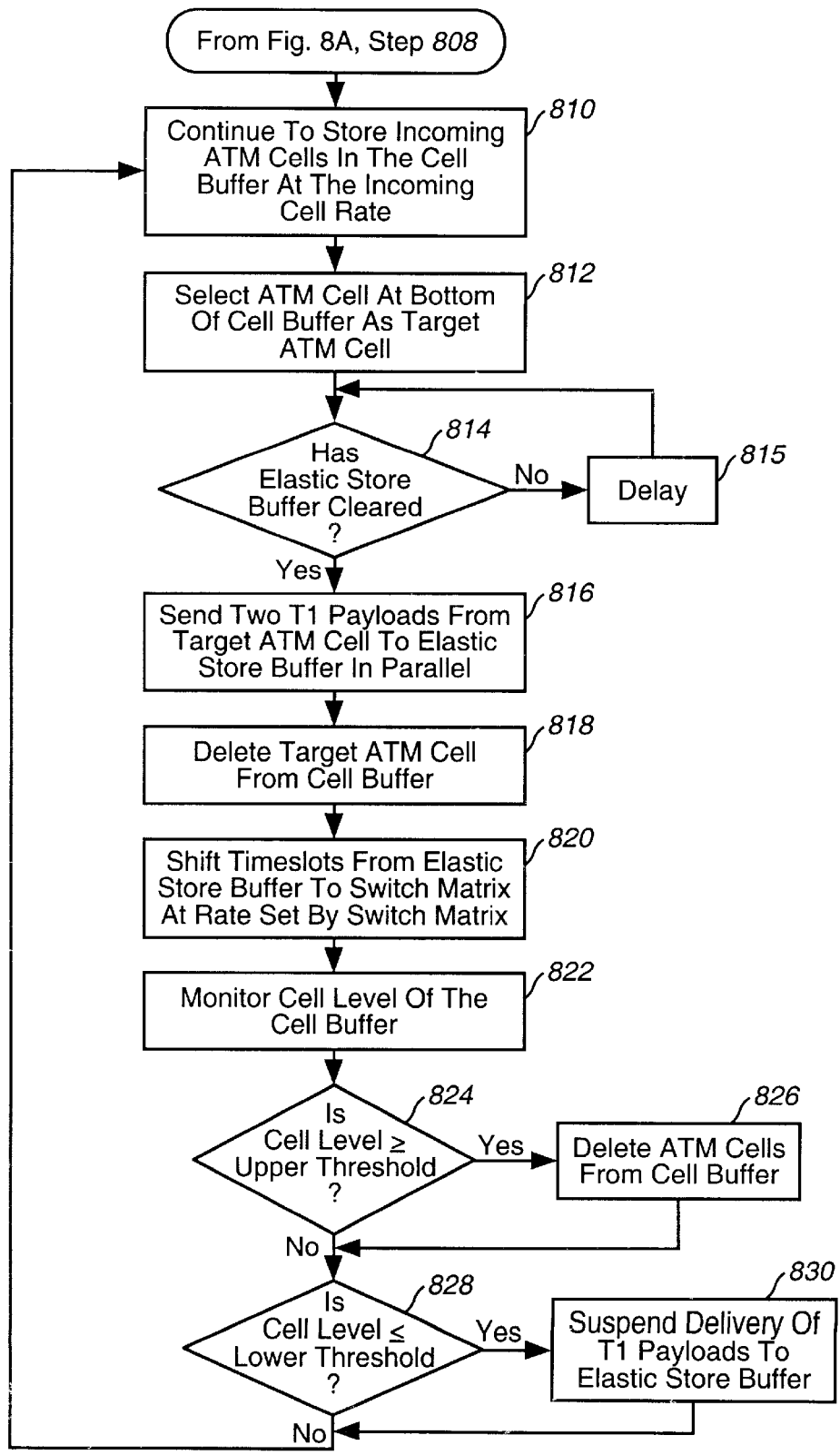
FIG. 8B — Steady-State Phase Of T1 Unloading Process

Component Level Description Of Cell Buffer And Elastic Store Buffer

METHOD AND SYSTEM FOR UNLOADING T1 PAYLOADS FROM ATM CELLS

CROSS REFERENCE TO RELATED APPLICATIONS

This patent application is related to the following commonly owned U.S. Patent applications/patents:

1. "Method and System for Processing an HDLC Message", Ser. No. 09/097,996 now issued as U.S. Pat. No. 6,195,346, by Forrest Pierson, filed concurrently herewith and incorporated herein by reference;

2. "Method, Apparatus and Computer Program Product for Interfacing a TDM Link With a Cell-Switched Network", Ser. No. 09/097,754, by Forrest Pierson, filed concurrently herewith and incorporated herein by reference; and 3. "Method and System for Emulating a TDM Link Over Cell-Switched Network", Ser. No. 09/099,671 now issued as U.S. Pat. No. 6,272,128, by Forest Pierson, filed concurrently herewith and incorporated herein by reference.

BACKGROUND OF THE INVENTION

1. Field of the Invention

The present invention relates generally to emulating a T1 communications link over an Asynchronous Transfer Mode (ATM) communications network. In particular, the present invention relates to a method for unloading T1 payloads from an ATM cell using a cell buffer and an elastic store buffer.

2. Related Art

A communications network serves to transport information among a number of locations. The information is usually presented to the network in the form of time-domain electrical signals and may represent any combination of voice, video, or computer data. A typical communication network consists of various physical sites called "nodes", interconnected by conduits called "links". Each link serves to carry information from one site to another site. Individual sites contain data terminating equipment (DTE) for combining, separating, and transforming data.

T1 (also known as DS1) is one type of digital communications link. T1 is a synchronous link capable of carrying 24 64 Kbps channels (or DS0 channels) which are time domain multiplexed (TDM) and transmitted over a single physical line. T1 was originally developed to carry digitized voice communication which leads to the 64 Kbps channel standard. This occurs because an analog voice signal can be adequately represented by a digital data stream if sampled at a rate of 8000 samples per second. If each voice sample is digitized using 8 bits, this results in a digital data stream of 64 kbps.

A T1 link transmits one T1 frame 8000 times per second (or one frame every 125 μs). Each T1 frame contains 24 DS0 timeslots, with 8 bits in each timeslot for a total of 192 bits, plus one additional frame bit that identifies the start of a T1 frame. This results in a data stream of 1.544 Mbps (8000 frames/sec·193 bits/frame).

A T1 link may process T1 frames in groups known as T1 superframes or T1 extended superframes (ESF). A T1 superframe is composed of 12 T1 frames, such that each superframe contains a frame bit section composed of 12 frame bits, and a payload section of 12 samples for each of the 24 channels. A T1 ESF comprises an ESF frame bit section including 24 frame bits, and an ESF payload section including 24 samples of each of the 24 channels.

Although T1 was developed for real time voice communications, it is not limited to voice communications. The physical line carrying the 24 channels is capable of carrying real time digitized voice communications or non-real time data communications. Thus, a broader definition of a T1 link is a digital TDM transmission link with a capacity of 1.544 Mbps.

Since T1 is a synchronous TDM link, once a channel connection has been set up between two users, that channel is dedicated until the connection is torn down. For example, if channel #5 of the 24 T1 channels is set up between user A and user B, channel #5 will carry all communication between user A and user B. If there is a pause in the communication between user A and user B during the transmission of a particular T1 frame, then that particular T1 frame will carry an empty channel #5 timeslot. It can be seen that even a short pause of one minute can lead to 480,000 T1 frames being transmitted with an empty channel #5 timeslot. This is so even if channel #6 is being fully utilized by computer data at 64 kBs, but the channel #6 user would like to send data over two channels (e.g. #5 and #6) for an effective rate of 128 kbps. This results in an inefficient use of the 1.544 Mbps of T1 link capacity.

Asynchronous Transfer Mode (ATM) is a type of communications network that makes more efficient use of channel capacity than a synchronous T1 link. The basic unit sent over an ATM network is an ATM cell. A DTE with an ATM port into the ATM cloud sends time domain multiplexed cells at whatever rate is needed to satisfy all of the demand from users using the DTE, but will buffer excess cells to be transmitted if demand temporarily exceeds capacity.

For example, assume user A wants to send data at a rate of 500 Kbps over a physical line into the ATM cloud with 1000 Kbps capacity for 10 seconds, and then not send anything for 10 seconds. Another user, user B, wants to send a large block of data, for example, a 100 million byte file of geological data used for oil field analysis. User B's priority is lower than that of user A.

Users A and B each start transmitting at the same time. The DTE would give user A as much of the 1000 kbps line capacity as it can use, since it has a higher priority. In this case, it's 50%. User B gets the remaining 50% since its priority is lower than user A. After 10 seconds user A stops sending data to the DTE, and the DTE allocates 100% of the line capacity to user B for the remainder of the time that user A is not sending data. When user A starts sending again, its higher priority traffic will force the DTE to scale back what user B sends. User A and user B would correspond to the users of channel #5 and #6 in the example three paragraphs back. The inherent efficiencies of ATM, with its ability to assign priorities such that intelligent decisions can be made on the spot, are one reason for its appeal to the telecommunications industry.

One way to improve the efficiency of a T1 link is to emulate or terminate a T1 line at an ATM DTE with private branch exchange (PBX) capabilities and package the T1 frames in ATM cells that are sent over an ATM network. At the ATM destination node, the T1 frames are unpackaged (or unloaded) and sent to a switch matrix. The switch matrix de-multiplexes the DS0 channels and sends them to their particular DS0 user destinations or to a T1 line to another PBX. This approach is referred to as T1 emulation over an ATM network.

As discussed earlier, T1 was originally developed to carry real time voice communications, but is also capable of carrying non-real time data communications. Voice communications requires that system delay be kept to a minimum. In other words, users of a T1 voice link will not tolerate noticeable transmission delay.

Real time voice is tolerant of an occasional deletion or duplication of a single frame of data. This typically occurs when the two end nodes carrying the T1 traffic are not synchronized to each other. They are then operating at different clock rates, with one clock rate slightly higher than the other is. When this happens, the faster running end node will send more frames than the slower running end node can receive, and the slower running end node will send fewer frames than the faster running end node expects. To accommodate this, a frame of data is deleted or duplicated, depending on whether too many or too few, respectively, are received by each end node. This frame deletion or duplication is called a frame slip.

Current methods for unloading T1 frames from ATM cells are configured for real time voice communications as opposed to non-real time data communications. What is needed is a method that may be configured for real time voice communications with little delay that can also be configured for non-real time data communications with little additional effort.

SUMMARY OF THE INVENTION

The present invention generally relates to emulating a T1 communications link over an Asynchronous Transfer Mode (ATM) communications network. In particular, the present invention relates to a method and system for unloading one or more T1 payloads from a target ATM cell. The invention can be customized to provide low delay for real time voice communications with occasional frame slips. Alternatively, the invention can be customized to provide high delay for non-real time data communications with virtually no frame slips. The modification to switch from serving real-time to non-real time communications is relatively easy to implement.

According to the present invention, a plurality of incoming ATM cells is stored in a cell buffer at a first rate, wherein the first rate is the incoming cell rate. Each ATM cell carries at least one T1 payload, and each T1 payload comprises a plurality of timeslots. Next, the buffer controller selects the ATM cell at the bottom of the cell buffer as the target ATM cell. The buffer controller sends the T1 payload(s) from the target ATM cell to an elastic store buffer. Finally, the plurality of timeslots that comprise each T1 payload are sent to a switch matrix at a second rate that is generally asynchronous from the first rate.

In one embodiment, the emulated T1 link is carrying non-real time communications, and the storage capacity of the cell buffer is made large to absorb differences between incoming cell rate and the switch matrix rate. This minimizes frame slips during the unloading of the one or more T1 frames.

In another embodiment, the emulated T1 link is carrying real time communications (e.g. voice), and the storage capacity of the cell buffer is made small to minimize system delay of the T1 link as each cell waits in the buffer.

Frame slips are handled differently for real-time communication than for non-real time communication. For real time communications, buffer controller monitors the cell level in the cell buffer and determines if the cell level exceeds an upper threshold. If the cell level exceeds an upper threshold, then the buffer controller instructs the cell buffer to deliver an ATM cell to the elastic store buffer a frame early. This overwrites, or deletes, the last frame stored in the elastic store buffer. It also reduces the level in the cell buffer since cells are removed faster than they arrive for one frame. This is repeated until the cell level returns to the nominal cell level. If the cell level equals or falls below a lower threshold, then the buffer controller instructs the cell buffer to delay delivery of T1 payloads to the elastic store buffer for a single frame. The elastic store buffer is automatically configured to always duplicate the last frame sent to it, so it will then repeat this last frame. This additional delay allows the network time to deliver another cell, which moves the buffer above the lower threshold.

For non-real time data delivery, when the buffer controller determines that the cell level exceeds an upper threshold, it instructs the cell buffer to delete a quantity of cells until the cell level returns to the nominal cell level. If the buffer controller monitoring the cell level in the cell buffer determines that the cell level drops below a lower threshold, it instructs the cell buffer to suspend delivery of cells to the elastic store buffer until the cell buffer fills up to the nominal cell level.

Other embodiments of this concept are possible. These are described as an example only, and give a sufficient description of the concept that someone readily skilled in the art can implement.

In another embodiment, the cell buffer and elastic store buffer are configured to unload dual T1 source payloads from the target ATM cell.

In another embodiment, the emulated T1 link is a fractional T1 link.

Further features and advantages of the present invention, as well as the structure and operation of various embodiments of the present invention, are described in detail below with reference to the accompanying figures.

BRIEF DESCRIPTION OF THE FIGURES

The accompanying figures, which are incorporated herein and form part of the specification, illustrate the present invention and, together with the description, further serve to explain the principles of the invention and to enable a person skilled in the pertinent art to make and use the invention. In the figures:

FIG. 5A is a diagram which illustrates a method of carrying two T1 payloads from a single T1 source in an ATM cell.

FIG. 5B is a diagram which illustrates a method of carrying two T1 payloads from dual T1 sources in an ATM cell.

FIG. 8B is an operational flowchart of the steady-state phase of the payload unloading process according to the present invention.

Figure 1:
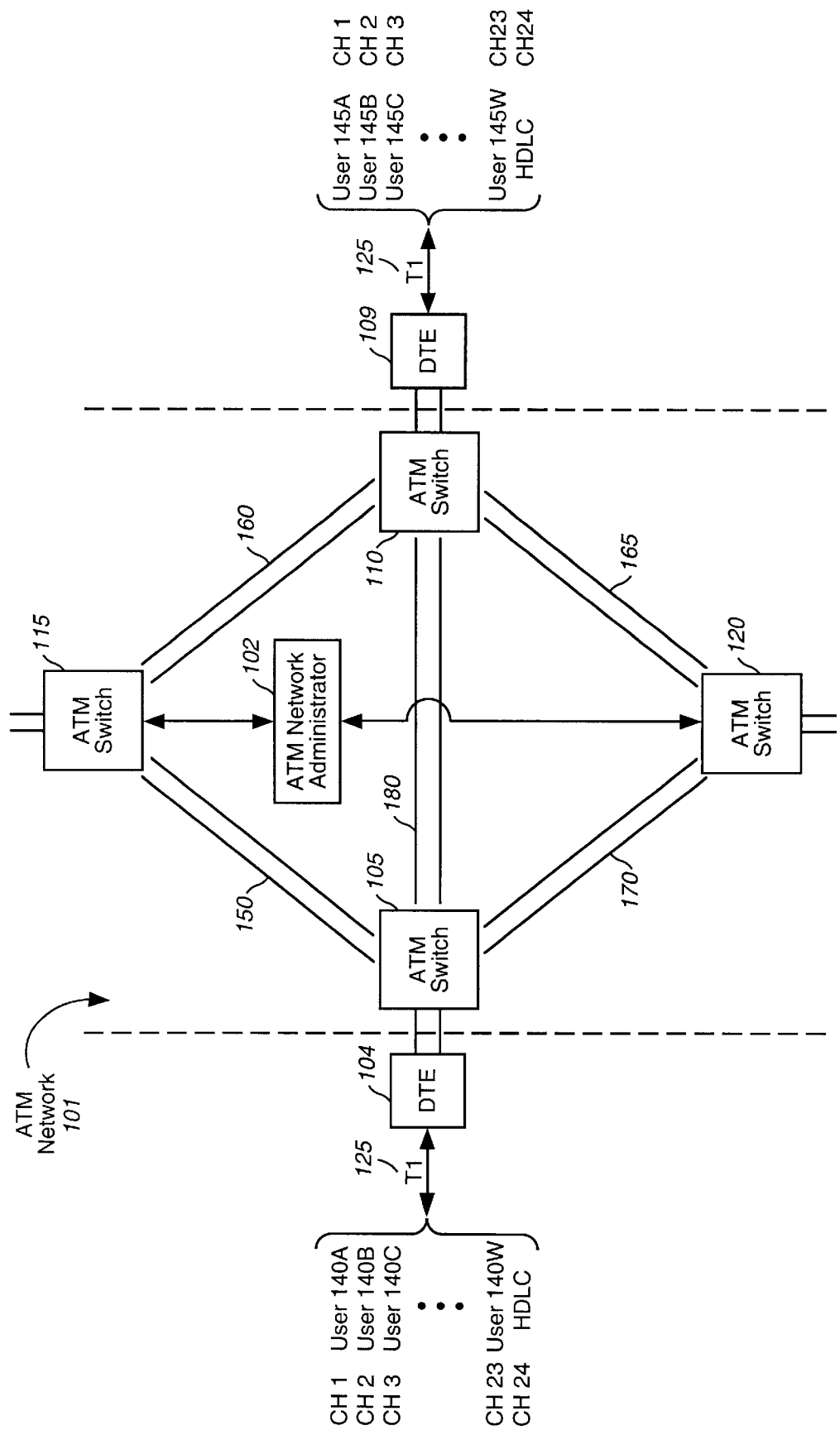
FIG. 1 is a block diagram which illustrates T1 emulation over an ATM network.

The present invention is described with reference to the accompanying figures. The following convention is generally adhered to in assigning reference numbers. In the figures, like reference numbers often indicate identical or functionally similar elements. Additionally, the left-most digit(s) of a reference number identifies the figure in which the reference number first appears.

DETAILED DESCRIPTION OF THE PREFERRED EMBODIMENTS

Table of Contents

I. Overview

II. Terminology

III. Example Environment

IV. T1 Frame and T1 Extended Superframe

V. ATM Cell
  A. ATM Cell Structure
  B. Carrying T1 Frames in ATM Cells
  C. Carrying T1 Frames from a Fractional T1 Link
  D. Single Source and Dual Source Operation VI. Unloading T1 Payloads from ATM Cells
  A. DTE Operation
  B. Detailed Description of T1 Payload Unloading Process VII. Cell Buffer Size and Frame Slips VIII. Dual Source Operation IX. E1 Emulation X. Conclusion

I. Overview

The present invention is directed toward unloading T1 payloads from ATM cells. The present invention uses a cell buffer and an elastic store buffer to unload T1 payloads from the ATM cells. The timeslots that comprise the T1 payloads are then sent to a switch matrix to be routed to their destination ports. The use of the cell buffer and elastic store buffer allows the ATM cells to be stored in the cell buffer at an incoming cell rate that is generally asynchronous from the rate the timeslots are sent to the switch matrix. The present invention may be configured for non-real time data communication or real time voice communication.

II. Terminology

To more clearly delineate the present invention, an effort is made throughout the specification to adhere to the following term definitions as consistently as possible. These definitions may be discussed throughout the specification with additional detail.

"Asynchronous Transfer Mode (ATM)" refers to a fast cell switched technology based on a fixed-length 53-byte cell. All broadband transmissions are divided into a series of cells and routed across an ATM network comprising of links connected by ATM switches. An ATM network carries a constant stream of ATM cells, but has the ability to allocate bandwidth on demand among multiple users. "DS0 channel" refers to standard 64 Kbps channel originally designed for, but not limited to, voice communications. A T1 link is capable of supporting 24 DS0 channels. "E1" refers to the European version of T1. E1 is capable of carrying 32 distinct 64 Kbps channels, verses 24 for T1. One of the 64 Kbps channels is used to provide a distinct framing pattern. Another channel carries signaling information concerning the status of the remaining 30 channels. The signaling status can alternately be replaced with an ISDN "D" channel, or carry a 31st 64 Kbps data channel if two or more E1 lines go from the same source to the same destination and share the same "D" channel on the other E1 line. "Fractional T1" refers to a T1 link that supports less than 24 active DS0 channels. Fractional T1 still carries 24 total DS0 channels but not all channels are in use. "Frame slip" refers to the condition which results when two end nodes are not being clocked at the same rate, resulting in the faster end node sending more frames than the slower end node is expecting, and the slower end node sending fewer frames than the faster end node is expecting. The frame slip occurs when a received frame is deleted or duplicated to bring the total number of received frames back in agreement with what the end node was expecting. "Non-real time communication" refers to communications where users can tolerate system delay, e.g. data communications. "Real time communication" refers to communications where users cannot tolerate system delay, e.g. voice communications. "Target ATM cell" refers to the ATM cell at the bottom of the cell buffer. The buffer controller selects this ATM cell and sends the T1 payloads from the target ATM cell to the elastic store buffer. "T1" refers to a time domain multiplexed (TDM) digital transmission link. T1 is capable of carrying 24 distinct 64 Kbps channels. In the United States, Canada, Hong Kong, and Japan, the T1 line bit rate is 1.544 Mbps. "T1 frame" refers to the basic unit of T1 communications. A T1 frame comprises of a T1 frame bit and a T1 payload. "T1 payload" refers to the portion of a T1 frame that carries the data for the 24 distinct 64 Kbps channels. A T1 payload comprises of 24 timeslots, one timeslot for each of the 24 distinct 64 Kbps channels carried by a T1 line. Each timeslot carries an 8 bit sample of the respective channel message. T1 payloads on fractional T1 lines also carry 24 timeslots, although all are not used. "Timeslot" refers to a portion of a T1 payload that carries the 8 bit sample of the channel message. In this application, the timeslot definition includes the 8 bit channel message sample.

III. Example Environment

Before describing the present invention in further detail, it is helpful to describe an example environment in which the invention can be implemented. It is not intended that the invention be limited to the example environment. In fact, after reading the following description, it will become apparent to a person skilled in the relevant art how to implement the invention in alternate environments.

One such environment is the use of an ATM network to emulate a T1 link. A simple illustration is shown in FIG. 1 where one or more users 140A–140W (23 users, 1 for each DS0 channel) connected to DTE 104 want to have voice or data communication with one or more users 145A–145W connected directly to DTE 109. This can be done over ATM network 101 by carrying a virtual T1 line (that is, it does not exist physically, but does conceptually) from DTE 104 and sending the T1 frames over ATM network 101 to DTE 109. DS0 channel #24 is a high level data link control channel (HDLC) used to carry call setup and tear down messages between DTE 104 and DTE 109.

DTE 104 packages the T1 frames in ATM cells and sends them to ATM switch 105. In one embodiment, ATM switch 105 determines the route to ATM switch 110 which is the most appropriate. Link 180 is clearly the most direct. But it may be that the level of existing data traffic on link 180 would require storage of the ATM cells before they can be sent on link 180. This may occur if network administrator 102 has directed that ATM switch 115 or 120 send cells on link 180. Also, link 180 may be non-operational at the moment for any number of reasons, such as a failed port on either end or anywhere in between, or a cut line.

Thus, ATM switch 105 may choose to send the ATM cells over link 150 to ATM switch 115 to avoid excessive traffic or route around a downed link. If so, ATM switch 115 reads the address in an ATM cell header and sends the ATM cells to ATM switch 110 via link 160. Alternatively, ATM switch 105 may choose to send ATM cells to ATM switch 120 via link 170. If so, ATM switch 120 reads the address in an ATM cell header and sends the ATM cells to ATM switch 110 via link 165.

In another embodiment, ATM network administrator 102 determines the best route and instructs all ATM nodes between ATM switch 105 and ATM switch 110 how to route the call.

Regardless of which route was taken or how the decision to make the connection occurs, ATM switch 110 will route the T1 link to DTE 109.

IV. T1 Frame and T1 Extended Superframe

Figure 2:
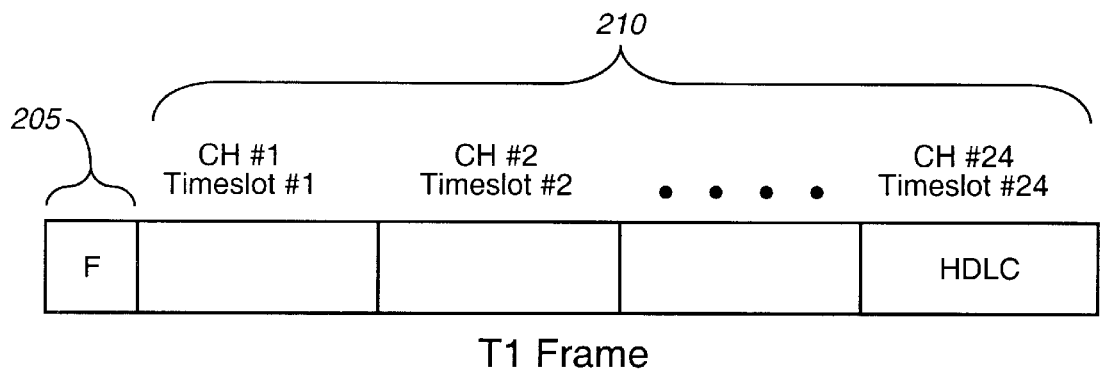
FIG. 2 is a diagram which illustrates the structure of a T1 frame.

FIG. 2 illustrates an exemplary T1 frame. The T1 frame comprises of a T1 frame bit 205 and a T1 payload 210. T1 payload 210 comprises of 24 DS0 timeslots, where each DS0 timeslot carries one byte of a link user message. DTE 1204 transmits 8000 T1 frames per second, which results in each of the 24 DS0 channels having a bit rate of 64 Kbps.

In primary rate ISDN, timeslot #24 in the T1 frame is used for the high level data link control (HDLC) channel. The HDLC channel carries link management messages back and forth between DTE 104 and DTE 109. Examples of these link management messages are call setup, and call tear down messages. For example, DTE 104 and DTE 109 communicate system information to setup a connection over the virtual T1 line when user 140A wants to send data to user 145A over the virtual T1 line. Likewise, DTE 104 and DTE 109 communicate to tear down the connection when user 140A or user 145A terminates the data transfer.

A fractional T1 link is a T1 link that supports less than 24 active DS0 channels. The number of timeslots in a T1 frame transported on a fractional T1 link in an ATM cell can reduced accordingly. For example, if the fractional T1 link supports 12 active 64 Kbps channels, each T1 frame will have 12 corresponding timeslots while being transported in the ATM cloud. A fractional T1 link still carries 8000 frames per second regardless of the number of channels supported.

Figure 3:
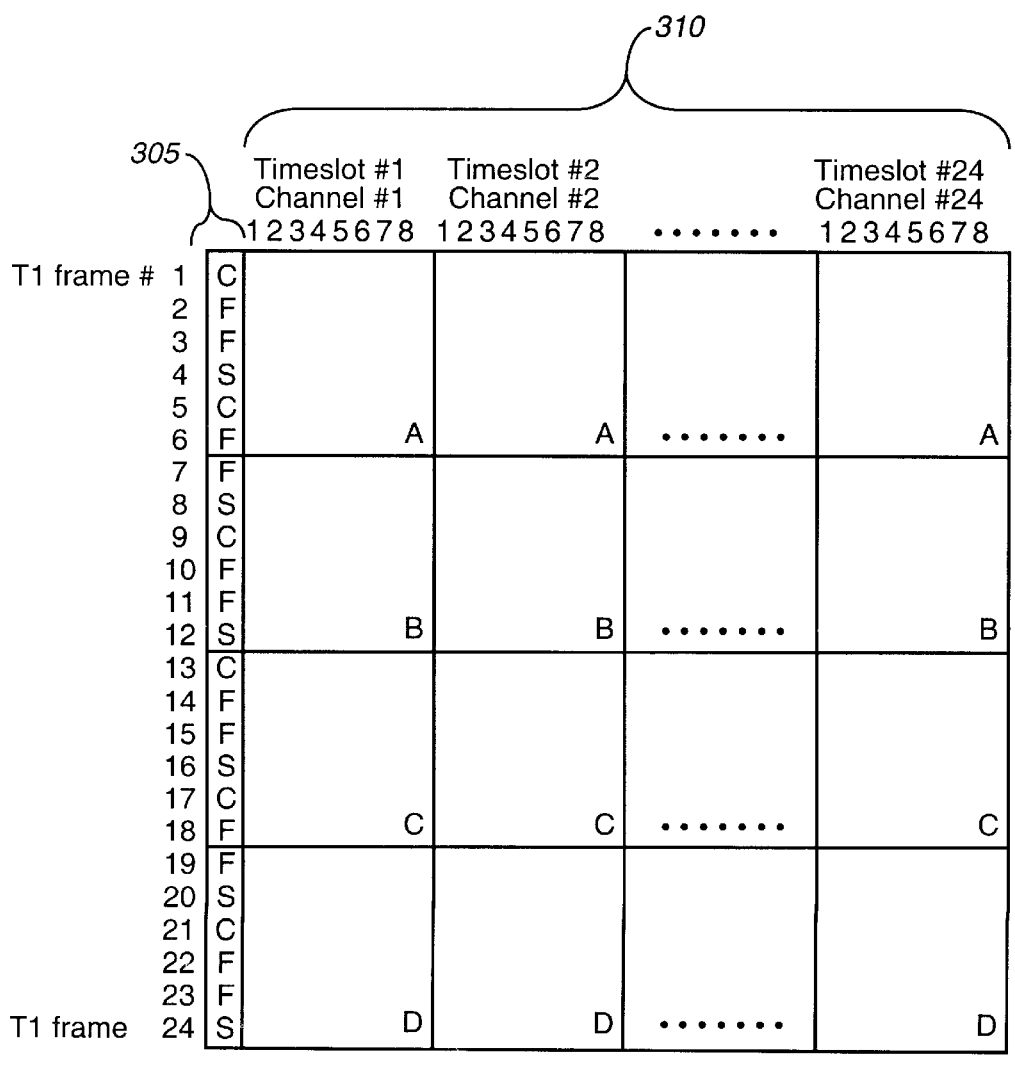
FIG. 3 is a diagram which illustrates the structure of a T1 Extended Superframe.

FIG. 3 represents an Extended Superframe (ESF), which is a group of 24 T1 frames that can be carried by T1 line 125. An Extended Superframe comprises frame bit section 305 and a payload section 310.

Frame bit section 305 comprises of 24 frame bits that can be one of three different types. Six of the frame bits are synchronization bits ("S" bits). A data framer uses the S bits to determine the start of an Extended Superframe. Twelve of the frame bits ("F" bits) are used for a Facilities Data Link channel (DL channel). Six of the frame bits are error checking bits ("C" bits) that implement the Cyclic Redundancy Check (CRC-6) method. The CRC-6 test discovers bit errors in the frame bit section 305 or payload section 310 caused by the physical line during transmission. If the CRC-6 test fails for a number of received ESFs, then a status message will be sent to the administrator(s) of DTE 104 and DTE 109 to give notice of the CRC-6 failures. The administrator of DTE 104 and DTE 109 will compare the error messages to similar error messages from the ATM ports. If errors exist in both, the administrator may dispatch a technician to check the physical line. If errors only exist in the virtual T1 link, the administrator may dispatch a technician to inspect and possibly replace one or more cards in the DTE.

V. ATM Cell

A. A TM Cell Structure

Figure 4A:
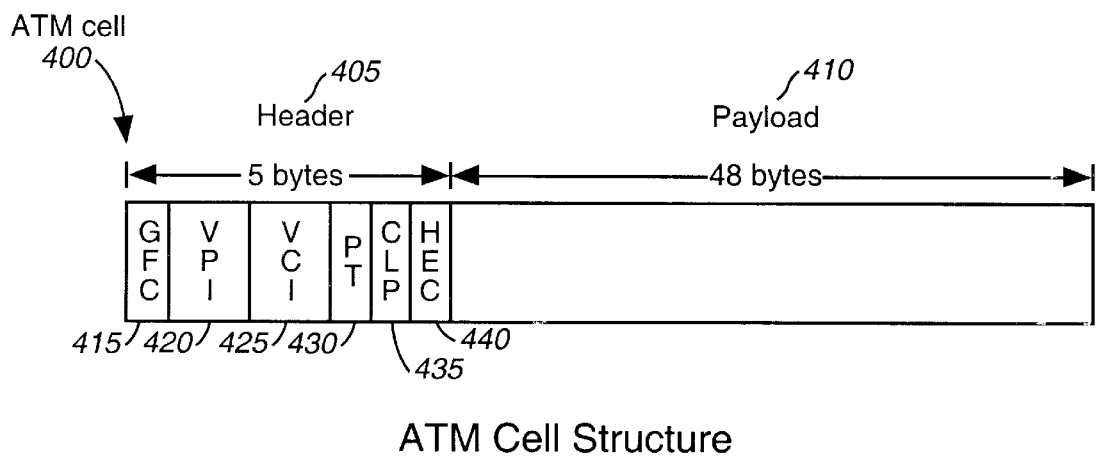
FIG. 4A is a diagram which illustrates the structure of an ATM cell.

FIG. 4A depicts the structure of the typical ATM cell sent over ATM network 101. ATM cell 400 comprises of ATM header 405 and ATM payload 410. The ATM header 405 is 5 bytes in length and the ATM payload 410 is 48 bytes (or 384 bits) in length.

ATM header 405 contains 6 distinct fields. In general, ATM header 405 is used to identify the destination, cell type, and priority of the ATM cell. The ATM header fields are as follows: a 4 bit generic flow control (GFC) field 415, a 12 bit virtual path indicator (VPI) field 420, a 16 bit virtual channel indicator (VCI) field 425, a 3 bit payload type (PT) field 430, a 1 bit cell loss priority (CLP) field 435, and an 8 bit header error check (HEC) field 440.

GFC field 415 is intended to carry cell flow rate information but was never implemented. It is always filled iwht all zeros and any value in it is ignored. VPI field 420 and VCI field 425 carries the destination address of a particular ATM cell. This allows ATM switches 115 and 120 to recognize that a particular ATM cell is destined for ATM switch 105 or ATM switch 110. PT field 430 indicates whether a cell contains user data (e.g. voice conversations), signaling data, or something else. CLP bit 435 indicates the relative priority of the cell. Lower priority cells are discarded before higher priority cells during intervals of congestion. HEC field 440 is an error detection field and is used to detect and sometimes correct header bit errors caused by the physical line during transmission.

B. Carrying T1 Frames in A TM Cells

Figure 4B:
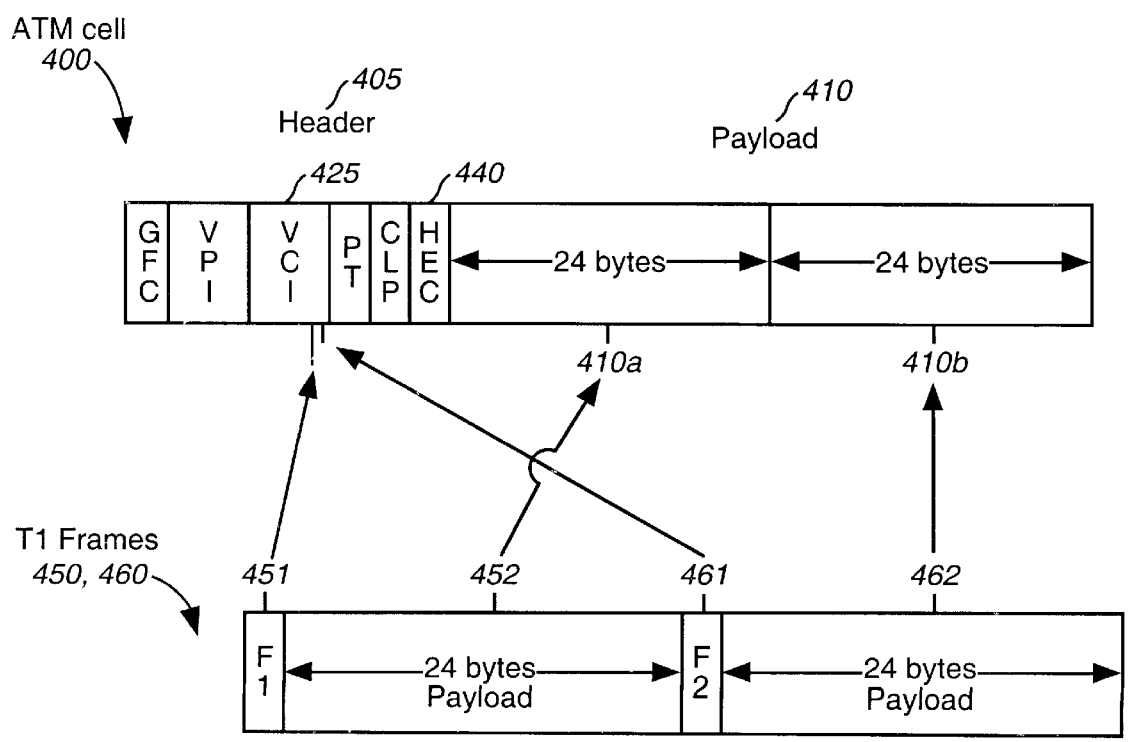
FIG. 4B is a diagram which illustrates a method of carrying two T1 frames in a single ATM cell.

FIG. 4B illustrates the one embodiment of how the present invention carries two T1 frames in each ATM cell carried over ATM network 101. ATM cell 400 has an ATM header 405 and an ATM payload 410. T1 frame 450 has a T1 frame bit 451 and a T1 payload section 452. Likewise, T1 frame 460 has a T1 frame bit 461 and a T1 payload section 462.

T1 payload sections 452 and 462 are both 24 bytes in size or 48 bytes total. ATM payload 410 is also 48 bytes in size, so that exactly two T1 payloads can fit within an ATM cell payload. In the present invention, ATM payload section 410a carries T1 payload 452. Likewise, ATM payload 410b carries T1 payload 462. ATM payload section 410a is the first 24 bytes of ATM payload 410. ATM payload section 410b is the second 24 bytes of ATM payload 410.

T1 frame bits 451 and 461 cannot be carried in the ATM payload 410. This is because T1 payloads 452 and 462 utilize the entire 48 byte capacity of ATM payload 410. Thus, the invention carries the T1 frame bits 451 and 461 in the ATM cell header 405.

In one embodiment, T1 frame bits 451 and 461 replace the two least significant bits in VCI field 425 of the ATM header 405. VCI field 425 is 2 bytes in size and is one of the two address fields in ATM header 405 (VPI field 420 being the other). ATM switches 115 and 120 use the address fields in ATM network 101 to route ATM cells to their proper destination DTE. By replacing the two least significant bits in VCI field 425 with T1 frame bits 451 and 461, the number of possible destination DTEs will be reduced, but not significantly. It will be necessary whenever a connection from DTE 104 to DTE 109 is established that all possible address combinations arising from the framing bit replacing an address bit in the VPI field 420 or VCI field 425 be included in any routing map in the ATM network 101.

In an alternate embodiment, T1 frame bits 451 and 461 replace any of the other bit locations of the VCI field 425. In another alternate embodiment, T1 frame bits 451 and 461 replace any of the other bits in the VPI field 420.

In another alternate embodiment, ATM cell 400 carries exactly one T1 frame. In this embodiment, the T1 frame bit may be carried within the ATM header 405, or within the ATM payload 410 along with its corresponding T1 payload. This embodiment would not be as efficient as the embodiment that carries two T1 frames within each ATM cell.

C. Carrying T1 Frames from a Fractional T1 Link in A TM Cells

As discussed earlier, a fractional T1 link supports less than 24 DS0 channels, where the number of active one-byte timeslots in a T1 frame carried over ATM network 101 is reduced accordingly. This allows more than two T1 frames to be carried in an ATM cell. The number of T1 frames that can be carried in an ATM cell depends on the actual number of active timeslots in each T1 frame. For example, if a fractional T1 link supports 12 distinct 64 Kbps channels, four T1 frames can be packaged in an ATM cell because each T1 frame carries 12 one-byte timeslots and the ATM cell payload has a 48 byte capacity.

D. Single and Dual T1 Source Operation

In the present invention, ATM cells may carry T1 frames over ATM network 101 from a single T1 source or a multiple T1 sources. FIGS. 5A and 5B illustrate single and dual T1 source operation, respectively. For illustrative purposes, single and dual source operation are discussed below.

In single T1 source operation, ATM cell 500 carries T1 payloads #1 and #2 from a single ESF 310a as shown in FIG. 5A. The ATM cell that follows will carry T1 payloads #3 and #4 from ESF 310a. The third ATM cell will carry T1 payloads #5 and #6.

In dual T1 source operation, ATM cell 500 carries T1 payload #1 from ESF 310a and T1 payload #1 from ESF 310b, as shown in FIG. 5B. ESF 310a and ESF 310b are generated from two distinct T1 sources. The ATM cell that follows will carry T1 payload #2 from ESF 310a and T1 payload #2 from ESF 310b. An advantage of dual source operation is that a single ATM cell may carry 48 DS0 channels compared with 24 DS0 channels for single source operation. The disadvantage associated therewith is that the cell rate during dual source operation may have to be doubled compared to single source operation.

Single and dual source operation are but one embodiment. Those skilled in the art will recognize that multiple T1 sources may be carried over ATM network 101.

VI. Unloading T1 Payloads from ATM Cells

Figure 6:
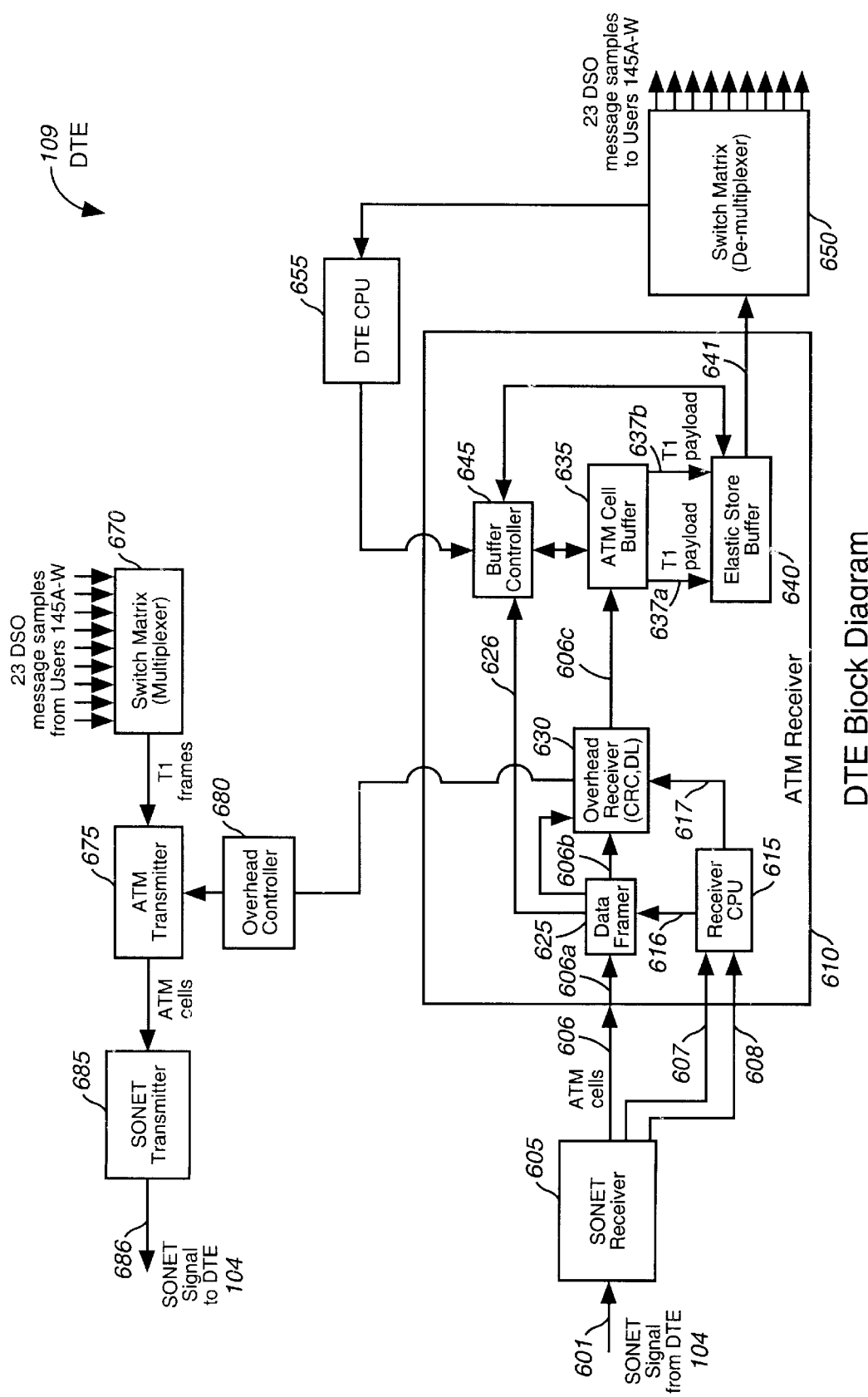
FIG. 6 is a block diagram of a data terminating equipment (DTE) according to the present invention.
Figure 7:
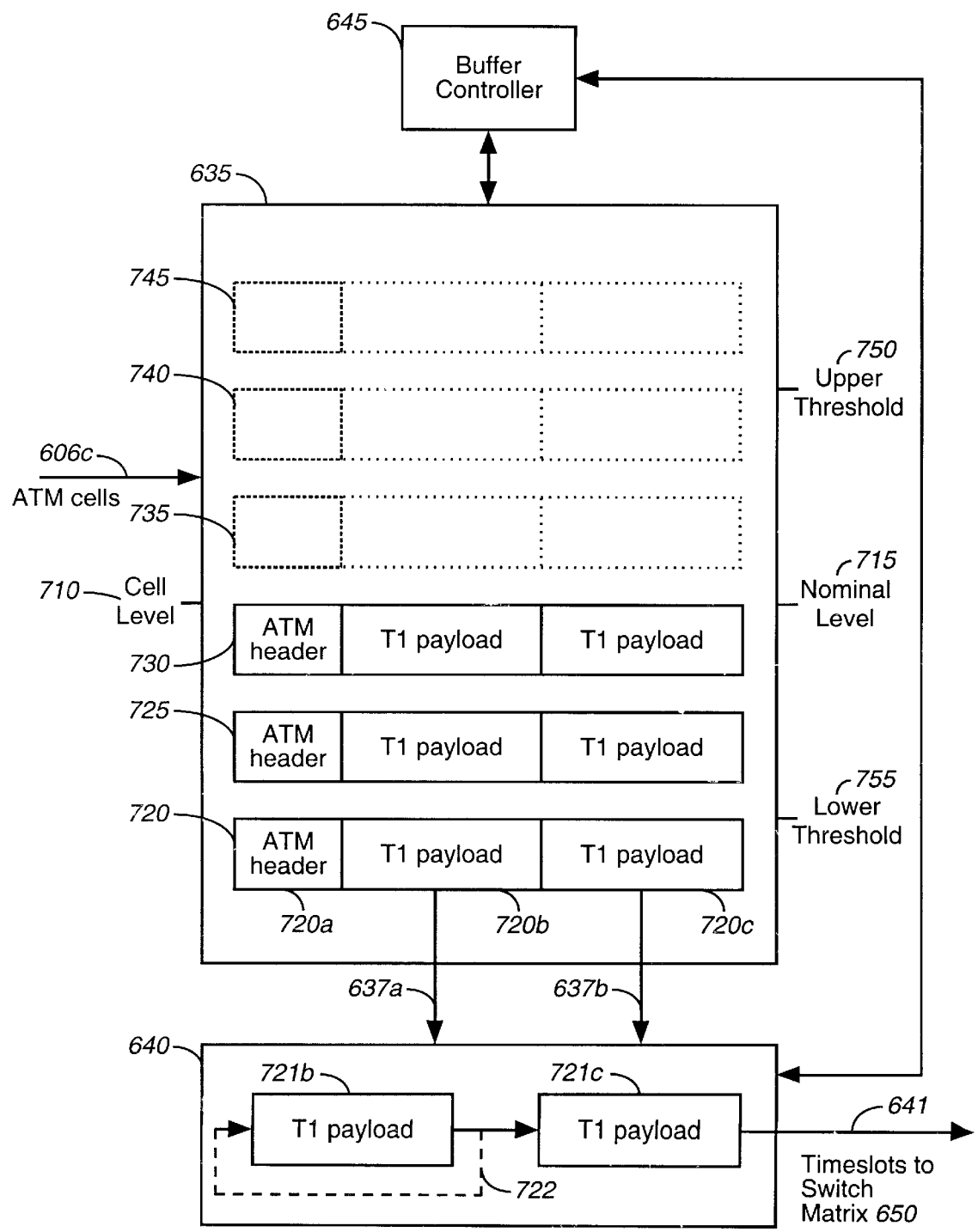
FIG. 7 is a block diagram which illustrates the cell buffer and elastic store buffer unloading T1 payloads from ATM cells according to the present invention.
Figure 8A:
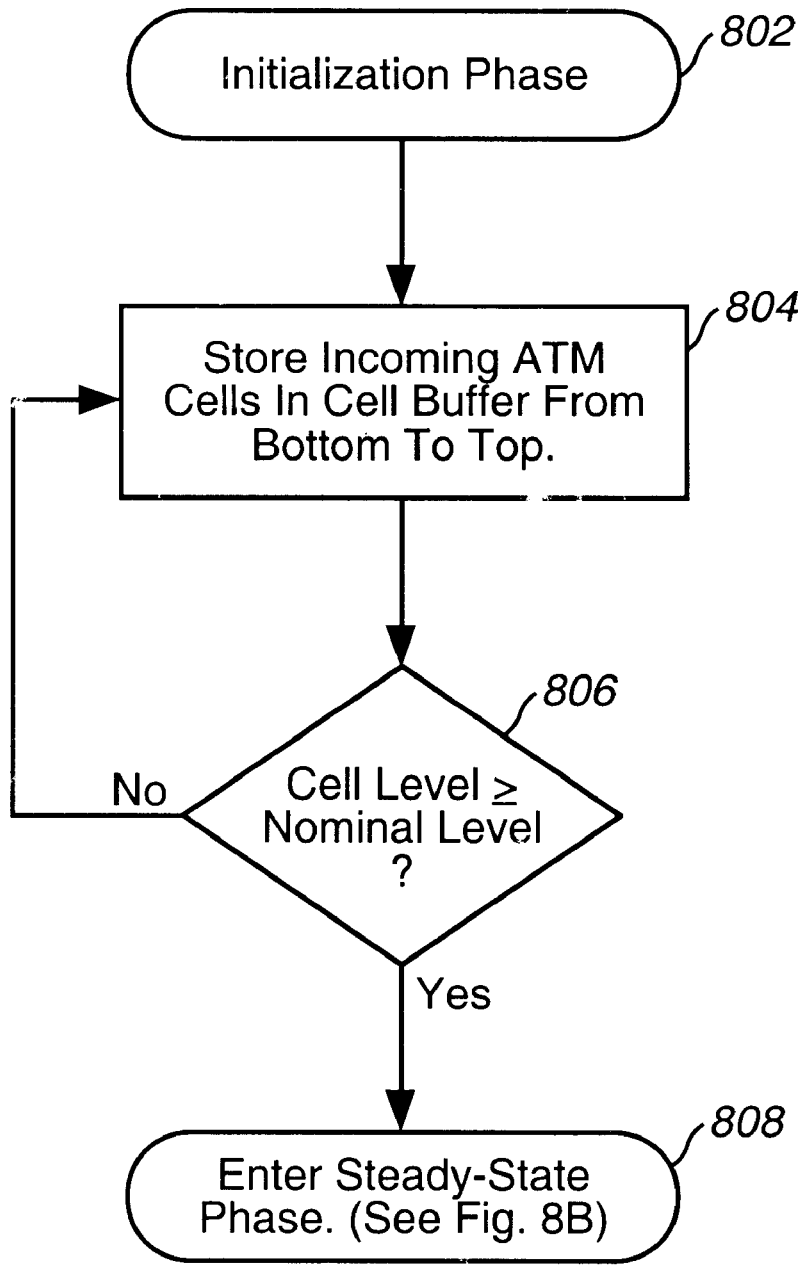
FIG. 8A is an operational flowchart of the initialization phase of the T1 payload unloading process according to the present invention.
Figure 9:
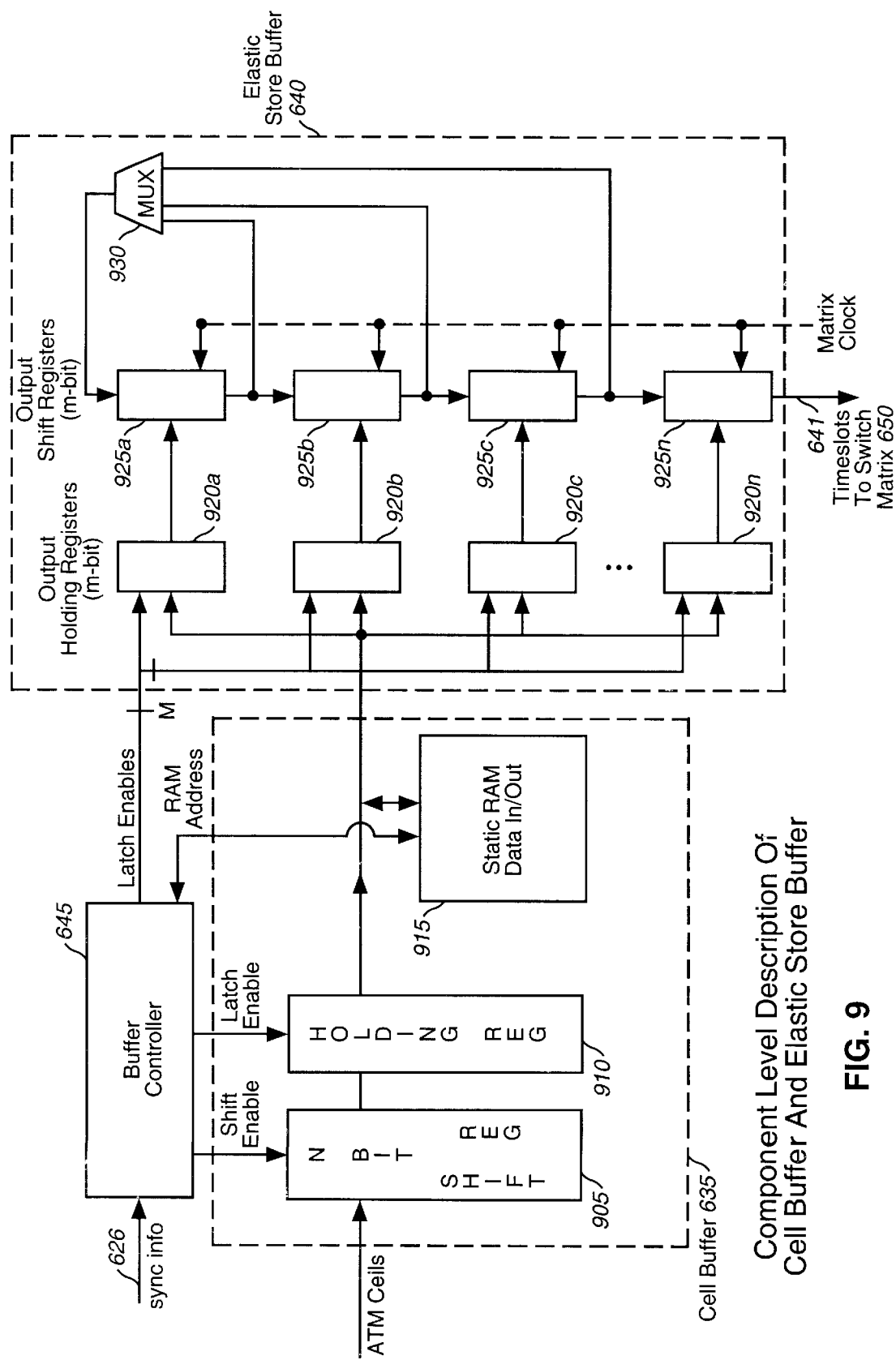
FIG. 9 is a block diagram which illustrates the components that comprise the cell buffer and the elastic store buffer according to the present invention.

FIGS. 6–9 illustrate the process of unloading T1 payloads from ATM cells at a Data Terminating Equipment (DTE) according to one embodiment of the present invention. FIG. 6 is a block diagram that illustrates DTE operation. FIG. 7 is a block diagram of the DTE components that perform the T1 payload unloading process. FIGS. 8A and 8B are operational flowcharts that illustrate how the FIG. 7 components unload T1 payloads from ATM cells. FIG. 9 is a more detailed block diagram of the components in FIG. 7.

A. DTE Operation

FIG. 6 is a block diagram which illustrates DTE 109 operation. DTE 109 has full-duplex capability, meaning DTE 109 can transmit and receive ATM cells simultaneously. DTE 109 receive components include: SONET receiver 605, ATM receiver 610, switch matrix 650, and DTE CPU 655. ATM receiver 610 includes: data framer 625, overhead receiver 630, receiver CPU 615, buffer controller 645, cell buffer 635, and elastic store buffer 640. DTE transmit components include: switch matrix 670, ATM transmitter 675, overhead controller 680, and SONET transmitter 685.

In one embodiment of the present invention, ATM cells arrive at DTE 109 embedded in a SONET signal 601. SONET is a family of physical line standards used with high speed fiber optic lines. SONET consists of a series of whole multiples of Synchronous Transfer Signals (STS) each operating at a bit rate of 51.84 Mbps. An STS-1 signal can transport a T3 signal. A T3 signal is used to carry 28 T1 signals, or it can dedicate part or all of its entire bandwidth to carrying a single data channel. When SONET is carried over a fiber optic, it runs at multiples of 3N times STS-1 rates. The slowest rate is Optical Carrier (OC)-3, indicating it carries three STS-1 signals. Higher rates are multiples of the OC-3 signal. When used to carry ATM cells, an entire OC-N payload is dedicated to the ATM cells and is considered concatenated. It is called OC-Nc. Therefore, a concatenated (i.e., ATM bearing) OC-3 would be called OC-$3_c$.

SONET receiver 605 receives SONET signal 601 from an ATM switch 110. SONET receiver 605 unloads the ATM cells from the SONET frames. SONET receiver 605 sends the unloaded ATM cells to ATM receiver 610 on line 606 at a cell rate $r_1$. SONET receiver 605 also generates cell start signal 607 and cell rate signal 608, which are sent to receiver CPU 615. Cell start signal 607 alerts receiver CPU 615 that an ATM cell is being unloaded from a SONET frame. Cell rate signal 608 informs receiver CPU 615 of the incoming ATM cell rate $r_1$. Unloading ATM cells from a SONET frame and generating control signals 607 and 608 are well known to those skilled in the art and do not need to be described in further detail.

Receiver CPU 615 determines the arrival time of each ATM cell based on control signals 607 and 608. Receiver CPU 615 sends enablement signal 616 to data framer 625 to signal the arrival of each ATM cell. Similarly, CPU 615 sends enablement signal 617 to overhead receiver 630.

Data framer 625 receives the ATM cells on line 606a at a cell rate $r_1$. In one embodiment, the T1 frames carried in the ATM cells are in an Extended Superframe Format (ESF). Data framer 625 does the ESF synchronization on the T1 frames carried in initial ATM cells unloaded from a new SONET frame. This amounts to finding T1 frame #1 in FIG. 3. This is necessary because the first ATM cell may not start with T1 frame #1. It is necessary to find a T1 frame #1 in the initial ESFs in order for the overhead receiver 630 to effectively utilize the ESF frame bit section 305 in the following ESFs. Overhead receiver 630 typically cannot distinguish the three types of ESF frame bits ("S,C,F") until data framer 625 has completed ESF synchronization.

ESF synchronization is made much easier in the present invention because exactly two T1 frames are contained within each ATM cell. Data framer 625 knows exactly where to look in each ATM cell for the two ESF frame bits, since they are always in the same location of an ATM cell header. In one embodiment, the ESF frame bits replace the two least significant bits in the VCI field of the ATM cell header. ESF synchronization is done by looking for a distinct pattern of ESF synchronization frame bits ("S" bits in frame bit section 305 in FIG. 3). Once the pattern is found, T1 frame #1 can be located. Data framer 625 sends the synchronization information to overhead controller 630 and to buffer controller 645. Even before the T1 frame #1 is found, however, received ATM cells can be placed in the ATM cell buffer 635.

Next, the ATM cells are sent to overhead receiver 630 on line 606b. Upon receiving enablement signal 617, overhead receiver 630 reads and stores the two ESF frame bits carried in the header of each ATM cell. When an entire ESF frame bit section has been read and stored, overhead receiver 630 does the CRC-6 error check on the appropriate ESF frame bits (the "C" bits in frame bit section 305 of FIG. 3). The CRC-6 error check detects bit errors in the ESF frame bit section which are caused by the physical line during transmission. Overhead receiver 630 sends the CRC-6 error check results to the overhead controller 680.

Overhead controller 680 keeps track of the number of CRC test failures. If a threshold is met, then overhead controller 680 formulates a status message to be sent to network administrator 102. Overhead controller 680 instructs ATM transmitter 675 to insert the status message in the DL channel of the outgoing ESF(s). It takes several ESFs to carry the status message from overhead controller 680 since only 12 of 24 ESF frame bits are devoted to the DL channel. Upon receipt of the status message, network administrator 102 may perform restoration or dispatch a technician to inspect the physical lines in ATM network 101.

Next, the ATM cells are sent to cell buffer 635 on line 606c. Cell buffer 635, elastic store buffer 640, buffer controller 645, and DTE CPU 655 operate to unload the T1 payloads from the ATM cells. Elastic store buffer 640 sends the unloaded T1 payloads to switch matrix 650 at a payload rate $r_2$, where $r_2$ is set by switch matrix 650. This is done by switch matrix 650 communicating $r_2$ to DTE CPU 655. Then, DTE CPU 655 notifies buffer controller 645 of the $r_2$ requirement. Buffer controller 645 programs a shift register (not shown) in elastic store buffer 640 to operate at $r_2$.

Cell buffer 635 stores the incoming ATM cells 606c at a cell rate $r_1$. The ATM cells are stored from the bottom of cell buffer 635 to the top. Buffer controller 645 monitors the cell level in cell buffer 635, where the cell level is a percentage of the total storage capacity. At initial startup, when the cell level reaches nominal level, buffer controller 645 initiates the transfer of T1 payloads to elastic store buffer 640.

Buffer controller 645 initiates the transfer of T1 payloads by selecting the ATM cell at the bottom of cell buffer 635. The selected cell is identified as the target ATM cell for clarity. Buffer controller 645 transfers the two T1 payloads from the target ATM cell to elastic store buffer 640. The two T1 payloads are transferred in parallel by lines 637a and 637b. Alternately, a single line may transfer one T1 payload, then the other, to elastic store buffer 640. In another embodiment, the two T1 payloads may be transferred from the ATM cell buffer in a series of smaller amounts until an entire ATM cell payload is transferred. Once the transfer is complete, the target ATM cell is deleted. When this occurs, a new ATM cell becomes the bottom ATM cell in cell buffer 635.

Elastic store buffer 640 sends the two transferred T1 payloads to switch matrix 650. In one embodiment, elastic store buffer 640 contains a shift register (not shown). The shift register shifts the two T1 payloads out on line 641. The shift register sends timeslots 641 to switch matrix 650 at a payload rate $r_2$. While the elastic store buffer 640 is clearing, buffer controller 645 selects next ATM cell, ready to give it to elastic store buffer 640 after it clears. The process is repeated.

Generally, incoming ATM cells 606c arrive at cell rate $r_1$ that is asynchronous with the payload rate $r_2$, where $r_2$ is set by switch matrix 650. This results in the need for the two buffers. Cell buffer 635 stores the incoming ATM cells 606c at cell rate $r_1$. Elastic store buffer 640 sends timeslots 641 to the switch matrix 650 at a payload rate $r_2$. The rate that ATM cells are drained from cell buffer 635 is 50% of $r_2$. This occurs because buffer controller 645 does not transfer the next set of T1 payloads until the shift register in elastic store buffer 640 has cleared, and the shift register is programmed operate at $r_2$.

Sending exactly two T1 payloads in parallel from cell buffer 635 to elastic store buffer 640 is but one embodiment. When ATM network 101 is emulating a factional T1 link, ATM cells 606c may carry greater than two T1 frames because the T1 payloads may comprise less than 24 timeslots. In this case, the number of T1 payloads sent between the cell buffer 635 and the elastic store buffer 640 may be an integer greater than two. In another alternate embodiment, the T1 payloads of two different T1 signals are sent to elastic store buffer 640 which shifts both to switch matrix 650 in a single frame.

Switch matrix 650 receives the timeslots 641 at a payload rate $r_2$. Switch matrix 650 de-multiplexes 23 of the 24 timeslots in each T1 payload and sends them to their respective Users 145A–W. It is useful to recall that a T1 link carries 8000 T1 frames/sec. Thus, each timeslot in a T1 frame carries only a small sample of the voice or data message destined for Users 145A–W. The $24^{th}$ timeslot in each T1 payload is the HDLC timeslot. The HDLC timeslot is used by DTE 104 and DTE 109 to communicate link management messages. In one embodiment, the HDLC channel is copied out of the T1 payload before being presented to switch matrix 650, and thus does not need to go to a destination user. This is fully described in co-pending U.S. Application entitled "Method and System for Processing an HDLC message".

During transmission, switch matrix 670 forms outgoing T1 frames by multiplexing voice or data message samples that Users 145A–145W want to send to Users 140A–140W. Switch matrix 670 sends the outgoing T1 frames to ATM transmitter 675.

ATM transmitter 675 forms outgoing ATM cells by packaging two T1 frames in each ATM cell. As discussed earlier, each ATM cell payload typically carries two T1 payloads, except in fractional T1 link situations. The frame bit for each T1 payload replaces a bit in the ATM cell header. If the T1 frames are in the ESF format, overhead controller 680 may submit an overhead status message to ATM transmitter 675. ATM transmitter 675 inserts the overhead status message in the DL channel of the outgoing ESF frame bits carried in the ATM cell header. ATM transmitter 675 sends the outgoing ATM cells to SONET transmitter 685.

SONET transmitter 685 forms SONET signal 686 by packaging outgoing ATM cells inside SONET frames. SONET transmitter 685 sends SONET signal 686 to DTE 104 over ATM network 101. Packaging ATM cells in SONET frames and forming SONET signal 686 are well known to those skilled in the art and need not be described in further detail.

B. Detailed Description T1 Payload Unloading Process

FIGS. 7, 8A, and 8B illustrate the T1 payload unloading process in ATM receiver 610. FIG. 7 is a functional block diagram including: cell buffer 635, elastic store buffer 640, and buffer controller 645. FIG.7 depicts cell buffer 635 as being 50% full with ATM cells 720, 725, and 730. Reference numbers 735, 740, and 745 depict empty storage space in cell buffer 635 that may be used to store more ATM cells.

FIGS. 8A and 8B depict operational flowchart 801. Operational flowchart 801 describes the T1 payload unloading process with reference to the FIG. 7 block diagram. The unloading process has two phases, an initialization phase and a steady state phase. FIG. 8A depicts the initialization phase 802. FIG. 8B depicts the steady-state phase 808.

The initialization phase begins with step 802, where control immediately passes to step 804. In step 804, cell buffer 635 stores incoming ATM cells 606c. ATM cells 606c are stored from the bottom of cell buffer 635 to the top, as shown in FIG. 7. Thus, cell 720 is the "oldest" ATM cell in cell buffer 635, and cell 730 is the latest arrival. ATM cell 720 consists of header 720a, and a ATM payload that carries two T1 payloads, 720b and 720c. Cell buffer 635 operates in a first-in first-out (FIFO) fashion.

In step 806, buffer controller 645 determines if cell level 710 of cell buffer 635 has reached a nominal level 715. Cell level 710 is the number of ATM cells stored in cell buffer 635. Cell level 710 can be expressed as a percentage of the total storage capacity of cell buffer 635. If cell level 710 is lower than nominal level 715, then control returns to step 804. If cell level 710 exceeds nominal level 715, then control flows to step 808, which enters steady-state operation.

Step 806 requires that the cell buffer 635 fill to a nominal level 715 before exiting the initialization phase. This is done so that the cell buffer 635 enters the steady state phase with enough stored ATM cells to prevent future frame slips. Frame slips interrupt the flow of data to switch matrix 650 and are preferably avoided. In one embodiment, nominal level 715 is approximately 50% of the total storage capacity of cell buffer 635.

Step 808 exits the initialization phase and enters steady-state phase in FIG. 8B. Step 808 immediately passes control to step 810. In step 810, cell buffer 635 continues to store incoming ATM cells 606c. Cell buffer 635 continues to store ATM cells during the entire unloading process as they arrive, not just at steps 804 and 810 as is depicted in flowchart 801. Cell buffer 635 and elastic store buffer 640 operate asynchronously. Cell buffer 635 stores ATM cells at an incoming cell rate $r_1$. Elastic store buffer 640 sends timeslots to switch matrix 650 at a payload rate $r_2$, where $r_2$ is set by the switch matrix 650. In other words, generally $r_1$ and $r_2$ are independent of each other.

In Step 812, buffer controller 645 selects the ATM cell at the bottom of cell buffer 635 as the target ATM cell. In FIG. 7, cell 720 is the bottom ATM cell and becomes the target ATM cell. ATM cell 720 contains header 720a, and two T1 payloads 720b and 720c.

In step 814, buffer controller 645 determines if the elastic store buffer 640 has cleared. Elastic store buffer 640 is clear when it has sent the last timeslot to switch matrix 650 from a prior set of T1 payloads. If yes, then controls flows to step 816. If the elastic store buffer 640 has not cleared, then control flows to step 815. Step 815 is a delay step, where steps 814 and 815 continue to repeat until elastic store buffer 640 has cleared. Elastic store buffer 640 will be clear immediately after leaving the initialization phase because no T1 payloads have been sent yet by cell buffer 635.

In step 816, buffer controller 645 sends the T1 payloads in the target ATM cell to the elastic store buffer 640 in a parallel fashion. In FIG. 7, the 48 timeslots that comprise T1 payloads 720b and 720c are loaded into elastic store buffer 640 simultaneously. Once loaded, T1 payloads 720b and 720c are labeled 721b and 721c, respectively, for clarity.

Buffer controller 645 knows exactly where each 24-byte T1 payload is located in cell 720. T1 payload 720b starts immediately after the 5-byte ATM header 720a, and T1 payload 720c starts immediately after 24-byte T1 payload 720b. This illustrates an important advantage of carrying the T1 frame bits in the ATM cell header in that exactly two T1 payloads fit in an ATM cell payload. This simplifies tracking and unloading the T1 payloads.

Next in step 818, buffer controller 645 deletes the target ATM cell after the T1 payload transfer is complete. After which, ATM cell 725 falls to bottom of cell buffer 635 and becomes the target ATM cell.

In step 820, elastic store buffer 640 sends the timeslots loaded from the target ATM cell to switch matrix 650. In one embodiment, elastic store buffer 640 contains a programmable shift register (not shown) that is capable of holding 48 bytes, or exactly two T1 payloads. In FIG. 7, T1 payloads 721b and 721c are parallel loaded in the shift register. T1 payload 721c is shifted out first in one timeslot (or 1 byte) increments. As T1 payload 721c is being shifted out of elastic store buffer 640, T1 payload 721b incrementally moves into the slots vacated by T1 payload 721c. Once T1 payload 721c has completely left the shift register, then 721b is shifted out in like fashion. The shift register is programmed to operate at a payload rate $r_2$, which is set by switch matrix 650.

In step 822, buffer controller 645 measures cell level 710 of cell buffer 635. In step 824, buffer controller 645 determines if cell level 710 exceeds an upper threshold level 750. If not, then control flows to step 828. If cell level 710 does exceed upper threshold level 750, then control flows to step 826. In step 826, buffer controller 645 directs cell buffer 635 to delete a quantity of stored ATM cells until cell level 710 returns to the nominal cell level 715 for non-real time data. For real time voice, buffer controller 645 directs cell buffer 635 to deliver the next ATM cell to the elastic store buffer a frame early. In an embodiment where two different T1 signals are carried in a single ATM cell, buffer controller 645 directs cell buffer 635 to delete a single ATM cell for real time voice.

Steps 822–826 prevent cell buffer 645 from filling to capacity with ATM cells. This is necessary because ATM cells 606c arrive at a rate $r_1$ that is asynchronous from the rate $r_2$ that T1 payloads are delivered to the switch matrix 650. During the initialization phase, step 806 does not permit the unloading process to enter the steady-state phase until cell level 710 exceeds nominal level 715. Once the steady-state phase begins, if the incoming cell rate $r_1$ is exactly ½ of the payload rate $r_2$, then cell buffer 635 will continuously operate around the nominal level 715. This is because each ATM cell carries exactly two T1 payloads. However, if $r_1$ is higher than 50% of $r_2$, then cell buffer 635 will eventually fill to capacity. Steps 822–826 prevents cell buffer 635 from filling to capacity by deleting one or more ATM cells from cell buffer 635, or delivering them a frame early, when cell level 710 reaches an upper threshold 750.

In one embodiment, the upper threshold is set at approximately 100% of the total storage capacity of cell buffer 635, and the nominal level is approximately 50% of the total storage capacity. This embodiment is most likely to be used for non-real time data. In an alternate embodiment, upper threshold 750 is set at some level below the capacity of cell buffer 635, and the nominal capacity at half that. This embodiment is most likely to be used for real time voice. The actual level of the nominal and upper thresholds will be determined by analyzing the total network delay variation. The delay variation is the amount of change that can occur in the arrival time of an ATM cell from source to destination, which is governed by how much total traffic the network carries. As more traffic is carried, the delay will increase as the cell typically waits longer in a buffer inside each ATM switch before being sent to the next switch. As less traffic is carried, the delay will decrease as the cell typically waits less in a buffer inside each ATM switch before being sent to the next switch.

In step 828, buffer controller 645 determines if cell level 710 is below a lower threshold level 755. If not, then control flows to step 810 where the unloading process is repeated. In one embodiment, lower level 755 is reached when cell buffer 645 is empty. If cell buffer 635 is empty, then control flows to step 830. In step 830, for non-real time data, buffer controller 645 directs cell buffer 635 to suspend delivery of T1 payloads. T1 payload delivery is suspended until cell level 710 returns to nominal level 715. This allows the incoming ATM cells 606c to re-fill cell buffer 635 to nominal level 715 before steady-state operation is resumed. After the cell buffer re-fills to nominal level 715, control returns to step 810 and the unloading process is repeated. In an alternate embodiment, action is taken before cell buffer 635 has completely emptied out.

For real time voice, step 830 instructs buffer controller 645 to wait an extra frame and then return to step 822. This allows additional time for incoming cells to arrive from SONET line 601. While waiting for an additional frame the elastic store buffer is duplicating the last delivered frame.

Steps 828 and 830 cover those situations where cell buffer 635 is emptied of ATM cells. This is necessary when the incoming ATM cell rate $r_1$ is less than 50% of the payload rate $r_2$. When this condition occurs, ATM cells will be deleted from cells buffer 635 in step 818 faster than new ATM cells 606c arrive. Steps 828 and 830 provide the delay needed to handle an empty cell buffer 635.

Also, the present invention is not limited to processing ATM cells that carrying exactly two T1 payloads. As discussed earlier, fractional T1 links may support less than 24 distinct 64 Kbps channels, wherein the number of timeslots in each T1 payload is reduced accordingly. For example, if the fractional T1 link supports 12 distinct 64 Kbps channels, each T1 payload will carry 12 timeslots instead the normal 24 timeslots. In this example, the target ATM cell may carry four T1 payloads. Thus, four T1 payloads will be loaded into elastic store buffer 640 in step 816, instead of two. But, the total number of timeslots (or bytes of data) transferred will remain at 48.

In another embodiment, buffer controller 645 may not use ATM cells as the unit of measure of storage in cell buffer 635, but instead may use frames of T1 payloads. In another embodiment, buffer controller 635 may use DS0 payloads stored in cell buffer 645 as the unit of measurement.

FIG. 9 is a block diagram of components used to construct cell buffer 635 and elastic store buffer 640. Cell buffer 635 comprises an n-bit shift register 905, holding register 910, and static RAM 915. Elastic store buffer 640 comprises output holding registers 920a–n and output shift registers 925a–n.

Buffer controller 645 receives synchronization (sync) signal 626 from data framer 625. Sync signal 626 notifies cell buffer 645 of the arrival of an ATM cell on line 606c and the incoming cell rate $r_1$. Based on this information, buffer controller 645 programs shift register 905 to collect the arriving ATM cells 606c in n-bit increments. In one embodiment, buffer controller 645 enables shift register 905 only during arrival of the ATM payload section. Thus, shift register 905 skips over the header section of each ATM cell and only reads the two T1 payloads carried in each ATM payload. In another embodiment, the entire ATM cell is read by shift register 905.

Once shift register 905 is full, buffer controller 645 transfers the contents to an n-bit holding register 910. This frees shift register 905 to accept another n-bit section of the arriving ATM cells 606c. In one embodiment, shift register 905 and holding register 910 have a one byte capacity, which is the width of many memories that could be used for static ram 915. Buffer controller 645 latches holding register 910 until it is convenient to read the data into static RAM 915.

Holding register 910 is necessary because buffer controller 645 may be reading data out of static RAM 915 in order to send it to elastic store buffer 640. If data were to be taken directly from shift register 905, the data would have to be written to ram 915 at precisely the moment the shift register fills up or else it would be lost or distorted. If ram 915 happens to be delivering data to elastic store buffer 640 at that moment, the write operation could not take place. Thus, holding register 910 can hold the contents of shift register 905 for n $r_1$ clock periods, giving cell buffer controller 645 time to complete the read operation and perform the write operation. Once the holding register 910 contents have been stored in static RAM 915, holding register 910 is available and may be loaded with the next n-bit data section from shift register 915.

In another embodiment, static ram 915 may be a dual ported ram and can be written to by shift register 905 into one port while being read from another port simultaneously. This would eliminate the need for holding register 910.

Buffer controller 645 reads T1 payloads out of static RAM 915 and loads them into m-bit holding registers 920a–n. Holding register 920a–n can collectively hold two T1 payloads or 48 one-byte timeslots. This corresponds with the two T1 payloads carried in each arriving ATM cell 606c. In one embodiment, there are 48 holding registers, and each holds one byte or one timeslot. The reason for multiple holding registers is that in one embodiment, the parallel width of ram 915 is smaller than 48 bytes, requiring multiple reads to get all 48 bytes out. Thus, each transfer from ram 915 must be held until 48 bytes are read out.

Buffer controller 645 monitors shift registers 925a–n. When shift registers 925a–n have cleared, buffer controller 645 instructs holding registers 920a–n to parallel load the T1 payloads into shift registers 925a–n.

Shift registers 925a–n sends the two T1 payloads loaded from holding registers 920a–n to switch matrix 650. The T1 payloads are sent at clock rate $r_2$, where $r_2$ is set by switch matrix 650.

In one embodiment, multiple lines are used to allow MUX 930 to sample the output of several of the shift registers 925a–n. This allows MUX 930 to duplicate the last T1 payload in shift registers 925a–n. The duplicated T1 payload is inserted back into the shift input of shift register 925a. If the next pair of T1 payloads is suspended because cell level 710 falls below lower threshold 715 in step 824, then the duplicated T1 payload will be continuously sent until normal operation resumes. If there is no suspension of the delivery of T1 payloads, the duplicated T1 payload will be overwritten by a new T1 payload from holding registers 920a–n before it has a chance to be sent to switch matrix 650. Depending on how many T1 payloads are delivered to shift register 925a–n, MUX 930 will select the shift register half way from the end for two payloads, a third of the way from the end for three payloads, etc.

VII. Cell Buffer Size and Frame Slips

A frame slip occurs in step 824 of FIG. 8B if cell level 710 exceeds upper threshold 750. When this occurs, step 826 will delete one or more ATM cells from cell buffer 635 until cell level 710 returns to nominal level 715 for non-realtime data, or deliver the next ATM cell to elastic store buffer 640 a frame early for real time communications. A frame slip also occurs when cell level 710 falls below lower threshold 755, which in one embodiment is set to zero. When this occurs, step 830 suspends delivery of T1 payloads to elastic store buffer 640 until cell level 710 returns to nominal level 715 for non-real time data, or suspends delivery of T1 payloads to elastic store buffer 640 until another ATM cell has arrived for real time voice. As discussed earlier, steps 826 and 830 prevent cell buffer 635 from either filling to capacity or emptying out.

When an ATM network is emulating a T1 link carrying real time communication (e.g. voice), latency must be kept to a minimum. In other words, users of a T1 voice link will not tolerate noticeable transmission delay. This necessitates that the size of cell buffer 635 be kept to a minimum. A conventional cell buffer designed for voice communication will typically have a maximum storage capacity of 8 ATM cells. The network administrator may adjust this number up or down if he can determine that the total variation in delay caused by a cell waiting in cell buffers in each ATM switch requires more or needs less cell depth to cover the total variation in delay.

A conventional cell buffer (with a storage capacity of 8 cells) which is designed for real time communications is very susceptible to frame slips if either or both ends of the connection loose synchronization with the network. The effect of a single frame slip on a voice communication T1 link has minimal effect on the quality of voice communication. This is because each T1 frame comprises only one voice sample from each of the 23 T1 link users, and a T1 link carries 8000 T1 frames/sec. Thus, the loss of one T1 frame during a frame slip, or even 20 T1 frames will not be noticed by the users of a T1 voice link. In a typical switch design, if both ends lost network synchronization, their internal high stability oscillators would hold them sufficiently close to each other that there would only be 255 frame slips in any 24 hour period.

But a frame slip may have a significant effect when the T1 link is carrying non-real time data communications between link users. This results because every error in a data communications message may affect the interpretation of the entire data communications message. For example, if the T1 link is carrying financial transaction data, the loss of the T1 frame which carries the decimal point placement for a financial number may affect the balance of a bank account. This is not so for voice communications.

One advantage of the present invention is that the cell buffer 635 may be configured specifically for non-real time data communications. This is done by expanding the storage capacity of cell buffer 635 to an upper limit many times larger than what would be used for real time voice communications. By making the buffer 256 times as large as a real time voice buffer, or 2048 cells, if both ends of lost network synchronization, their internal high stability oscillators would hold them sufficiently close to each other that there would only be one frame slip in any 24 hour period.

Frame slips will occur with less frequency in the larger cell buffer. This is because the larger cell buffer will be operating from a nominal level of 1024 cells, compared with 4 cells for the smaller voice communication cell buffer. The larger cell buffer can sustain asynchronous operation for longer time periods before the cell level violates the upper or lower thresholds triggering a frame slip.

VIII. Dual Source Operation

As discussed with respect to FIG. 5, ATM cells traveling over ATM network 101 may carry T1 frames from a single T1 source or dual T1 sources. During dual source operation, each ATM cell carries one T1 payload from two distinct T1 sources. The advantage of dual source operation is that each ATM cell can carry 48 DS0 channels, instead the 24 DS0 channels carried during single source operation. The disadvantage of dual source operation is that cell rate over ATM network 101 must be doubled compared to single source operation.

Figure 10:
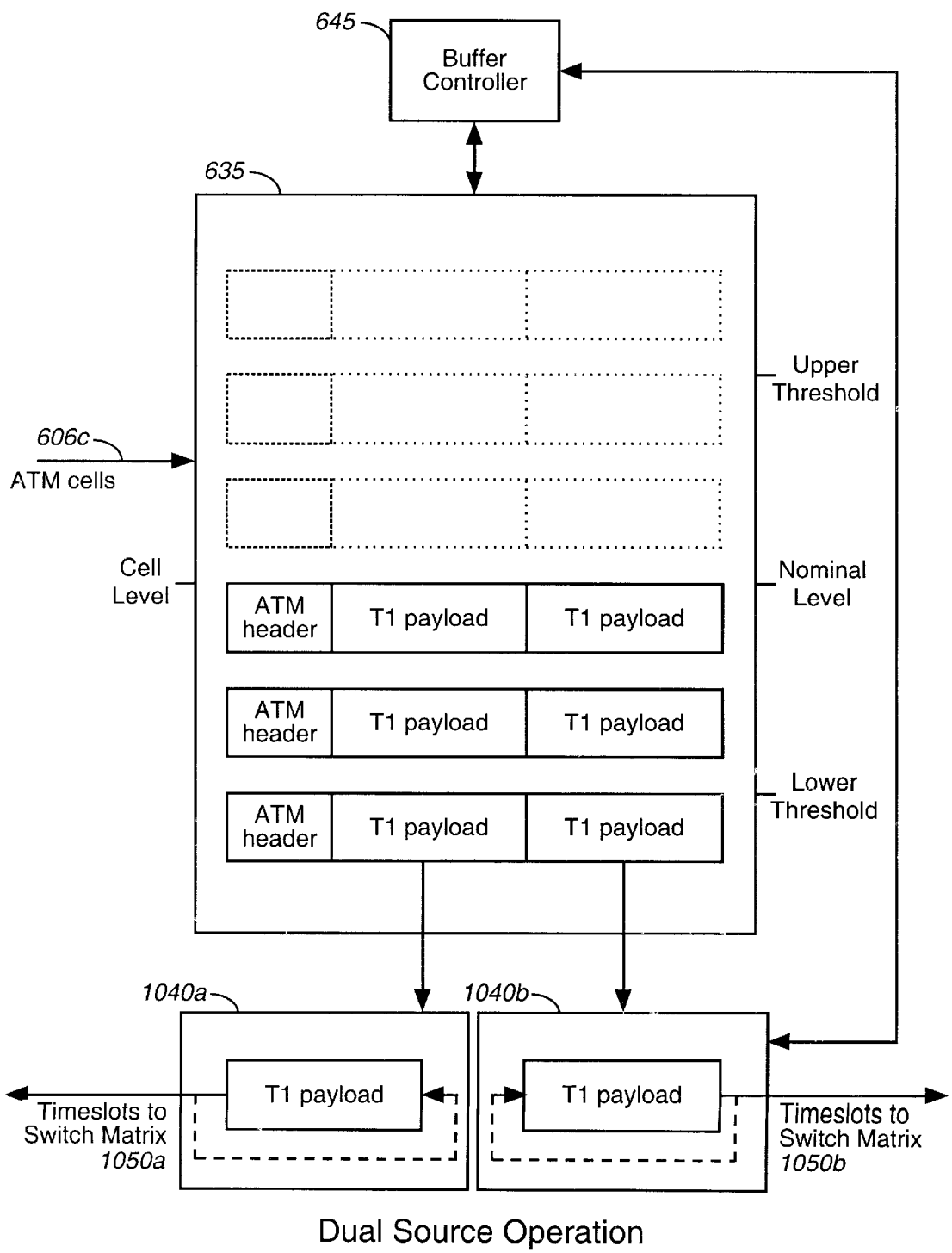
FIG. 10 is a block diagram which illustrates the cell buffer and elastic store buffer used to unload dual source T1 payloads from ATM cells according to the present invention.

FIG. 10 is a block diagram illustrating the cell buffer and elastic store buffer configuration used to unload dual source T1 payloads from ATM cells. FIG. 10 consists of buffer controller 645, cell buffer 635, and elastic store buffers 1040*a* and 1040*b*. Dual source unloading is very similar to single source unloading which was described with reference to FIG. 7.

The difference is that the 48-byte capacity of elastic store buffer 640 in FIG. 7 is split into two identical halves as shown in FIG. 10. This creates two elastic store buffers, 1040*a* and 1040*b*. Elastic store buffer 1040*a* has a 24 byte capacity and sends timeslots to switch matrix 1050*a* (not shown). Elastic store buffer 1040*b* has 24 byte capacity and sends timeslots to switch matrix 1050*b* (not shown). All other operational details are exactly as described in the earlier single source discussion which references FIG. 7.

IX. E1 Emulation

The present invention has been described in the environment of ATM network that is emulating a T1 link. Those skilled in the art will recognize that the invention is also useful in the environment of an ATM network emulating an E1 link. E1 is a European time domain multiplexed (TDM) communications standard that is very similar to T1. The difference is that an E1 link may carry 30 distinct voice grade channels, a framing channel, and a signaling channel for a transmission rate of 2.048 Mbps, whereas a T1 link may carry 24 distinct voice grade channels for a transmission rate of 1.544 Mbps. An E1 link transmits 8000 frames/sec just as a T1 link does.

An E1 frame carries 32 DS0 timeslots in an E1 payload, whereas a TI frame carries 24 DS0 timeslots in a T1 payload. In an E1 frame, the HDLC or signaling timeslot is the 31$^{st}$ timeslot in the E1 payload, and a framing pattern is carried in the 32nd. When the invention is practiced in the environment of an ATM network emulating an E1 link, only one E1 frame is carried in each ATM cell, although two or more fractional E1 frames can be carried if sufficient unused timeslots exist.

The present invention has been described with respect to emulating a T1 or E1 link, however, the present invention is not so limited. As would be apparent to a person skilled in the art, the present invention can be used in an ATM network emulating any synchronous or asynchronous link including, but not limited to, a T1 or E1 link.

X. Conclusion

While various embodiments of the present invention have been described above, it should be understood that they have been presented in a way of example only, and not limitation. It will be understood by those skilled in the art that the various changes in form and details may be made therein without departing from the spirit and scope of the present invention as defined in the appended claims. Thus, the breadth and scope of the present invention should not be limited by any of the above-described exemplary embodiments, but should be defined only in accordance with the following claims and their equivalents.

What is claimed is:

1. A method of unloading one or more T1 payloads from a target ATM cell, wherein said target ATM cell has traveled over an ATM network, wherein the ATM network is emulating a T1 link, the method comprising the steps of:

storing a plurality of ATM cells in a cell buffer at a first rate, wherein the first rate is an incoming cell rate;

selecting an ATM cell at a bottom of the cell buffer as the target ATM cell;

sending the one or more T1 payloads from the target ATM cell to an elastic store buffer, wherein each of the T1 payloads contains a plurality of timeslots; and sending the plurality of timeslots from the elastic store buffer to a switch matrix at a second rate, wherein the second rate is set by the switch matrix, wherein the first rate and the second rate are generally asynchronous.

2. The method of claim 1, wherein the T1 link is carrying non-real time communications, and wherein said step of storing comprises the step of storing a plurality of ATM cells in a cell buffer that has a storage capacity optimized to minimize frame slips during unloading of the one or more T1 payloads.

3. The method of claim 2, wherein said step of storing comprises the step of storing a plurality of ATM cells in a cell buffer that has a storage capacity of at least 2048 ATM cells.

4. The method of claim 1, wherein the T1 link is carrying real time communications, and wherein the step of storing comprises step of storing a plurality of ATM cells in a cell buffer that has a storage capacity configured to minimize a system latency of the T1 link.

5. The method of claim 4, wherein the step of storing comprises the step of storing a plurality of ATM cells in a cell buffer that has storage capacity of at most 8 ATM cells.

6. The method of claim 1, wherein said sending one or more T1 payloads to a elastic store buffer comprises the steps of:

determining if the elastic store buffer has cleared;

if the elastic store buffer has cleared, then sending the one or more T1 payloads from the target ATM cell to the elastic store buffer; and deleting the target ATM cell from the cell buffer.

7. The method of claim 1, wherein the T1 link is carrying non-real time data, further comprising the steps of:

determining if a cell level of the cell buffer equals or exceeds a upper threshold level; and if the cell level equals or exceeds the upper threshold level, then deleting a number of the stored ATM cells from the cell buffer until the cell level is equal to or below a nominal level.

8. The method of claim 1, wherein the T1 link is carrying real time communications, further comprising the steps of:

determining if a cell level of the cell buffer equals or exceeds a upper threshold level; and if the cell level equals or exceeds the upper threshold level, then delivering the one or more T1 payloads in the target ATM cell to the elastic store buffer a frame early.

9. The method of claim 1, wherein the T1 link is carrying non-real time data, further comprising the steps of:

determining if a cell level of the cell buffer equals or falls below a lower threshold level; and if the cell level equals or falls below the lower threshold level, then suspending delivery of the one or more T1 payloads from the cell buffer until the cell level equals or exceeds a nominal level.

10. The method of claim 1, wherein the T1 link is carrying real time data, further comprising the steps of:

determining if a cell level of the cell buffer equals or falls below a lower threshold level; and if the cell level equals or falls below the lower threshold level, then suspending delivery of the one or more T1 payloads from the cell buffer until another cell has arrived in the cell buffer.

11. The method of claim 10, further comprising the steps of:

duplicating a T1 payload in the elastic store buffer, wherein the duplicated T1 payload contains a plurality of timeslots; and sending the duplicated plurality of timeslots to the switch matrix until another cell has arrived in the cell buffer.

12. The method of claim 9, further comprising the steps of:

duplicating a T1 payload in the elastic store buffer, wherein the duplicated T1 payload contains a plurality of timeslots; and sending the duplicated plurality of timeslots to the switch matrix until another cell has arrived in the cell buffer.

13. The method of claim 1, further comprising the step of initializing the cell buffer, comprising the steps of:

determining if a cell level equals or exceeds a nominal level; and if a cell level equals or exceeds a nominal level, then entering a steady-state operation.

14. The method of claim 1, wherein the cell buffer and the elastic store buffer are configured for dual T1 source operation.

15. The method of claim 1, wherein the T1 link is a fractional T1 link.

16. A system for unloading one or more T1 payloads from a target ATM cell, wherein said target ATM cell has traveled over an ATM network, wherein the ATM network is emulating a T1 link, the system comprising:

storing means for storing a plurality of ATM cells in a cell buffer at a first rate, wherein said first rate is an incoming cell rate;

selecting means for selecting a ATM cell at a bottom of said cell buffer as the target ATM cell;

first sending means for sending the one or more T1 payloads from the target ATM cell to an elastic store buffer, wherein each of the one or more T1 payloads contains a plurality of timeslots; and second sending means for sending said plurality of timeslots from the elastic store buffer to a switch matrix at a second rate, wherein said second rate is set by said switch matrix, wherein said first rate and said second rate are generally asynchronous.

17. The system of claim 16, wherein the T1 link is carrying non-real time communications, and wherein a storage capacity of said cell buffer is configured to minimize frame slips during unloading of the one or more T1 payloads.

18. The system of claim 17, wherein said storage capacity of said cell buffer is at least 2048 ATM cells.

19. The system of claim 16, wherein the T1 link is carrying real time communications, and wherein a storage capacity of said cell buffer is configured to minimize system latency of the T1 link.

20. The system of claim 19, wherein said storage capacity of said cell buffer is at most 8 ATM cells.

21. The system of claim 16, wherein said sending one or more T1 payloads to an elastic store buffer comprises:

determining means for determining if said elastic store buffer has cleared;

third sending means, responsive to a determination that said elastic store buffer has cleared, for sending the one or more T1 payloads from the target ATM cell to said elastic store buffer in a parallel manner; and deleting means for deleting said target ATM cell from said cell buffer.

22. The system of claim 16, wherein said T1 link is carrying non-real time data, the system further comprising:

determining means for determining if a cell level of said cell buffer equals or exceeds a upper threshold level; and deleting means, responsive to a determination that said cell level equals or exceeds said upper threshold level, for deleting a number of said stored ATM cells from said cell buffer until said cell level is equal to or below a nominal 8 level.

23. The system of claim 16, wherein said T1 link is carrying real time data, the system further comprising:

determining means for determining if a cell level of said cell buffer equals or exceeds a upper threshold level; and third sending means, responsive to a determination that said cell level equals or exceeds said upper threshold level, for sending said one or more T1 payloads from the target ATM cell to said elastic store buffer a frame early.

24. The system of claim 16, wherein said T1 link is carrying non-real time data, further comprising:

determining means for determining if a cell level of said cell buffer equals or falls below a lower threshold level; and suspending means, responsive to a determination that said cell level equals or falls below said lower threshold level, for suspending delivery of the one or more T1 payloads from said target cell until said cell level equals or exceeds a nominal level.

25. The system of claim 16, wherein said T1 link is carrying real time data, further comprising:

determining means for determining if a cell level of said cell buffer equals or falls below a lower threshold level; and suspending means, responsive to a determination that said cell level equals or falls below said lower threshold level, for suspending delivery of the one or more T1 payloads from said target ATM cell until another cell has arrived in said cell buffer.

26. The system of claim 25, further comprising:

duplicating means for duplicating a T1 payload in said elastic store buffer, wherein said duplicated T1 payload contains a plurality of timeslots; and sending said duplicated plurality of timeslots to said switch matrix until another cell has arrived in the cell buffer.

27. The system of claim 16, further comprising a cell buffer initialization means, comprising:

determining means for determining if a cell level equals or exceeds a nominal level; and steady-state means, responsive to a determination that said cell level equals or exceeds a nominal level, for entering a steady-state phase.

28. The system of claim 16, wherein said cell buffer and said elastic store buffer are configured for dual source operation.

29. The system of claim 16, wherein the T1 link is a fractional T1 link.

30. A system for unloading one or more payloads from a target ATM cell, wherein said target ATM cell has traveled over an ATM network, wherein the ATM network is emulating a communications link, the system comprising:

storing means for storing a plurality of ATM cells in a cell buffer at a first rate, wherein said first rate is an incoming ATM cell rate;

selecting means for selecting a ATM cell at a bottom of said cell buffer as the target ATM cell;

sending means for sending the one or more T1 payloads from the target ATM cell to an elastic store buffer, wherein each of the one or more T1 payloads contains a plurality of timeslots; and sending means for sending said plurality of timeslots from the elastic store buffer to a switch matrix at a second rate, wherein said second rate is set by said switch matrix, wherein said first rate and said second rate are generally asynchronous.

31. The system of claim 30, wherein said communications link comprises a time division multiplexed (TDM) link.

32. The system of claim 31, wherein said TDM link comprises at least one of a T1 link and E1 link.

* * * * *